US00RE41822E

(19) United States
(12) Reissued Patent
Henley

(10) Patent Number: US RE41,822 E
(45) Date of Reissued Patent: Oct. 19, 2010

(54) TAG

(76) Inventor: Michael Henley, The Byre Windley Hall Farm, Windley, Derbyshire (GB), DE56 2LP

(21) Appl. No.: 29/294,567

(22) Filed: Sep. 21, 2007

Related U.S. Patent Documents

Reissue of:
(64) Patent No.: Des. 542,353
Issued: May 8, 2007
Appl. No.: 29/241,600
Filed: Oct. 28, 2005

(30) Foreign Application Priority Data

Apr. 28, 2005 (EP) ..... 338363-002
Apr. 28, 2005 (EP) ..... 338363-003
Apr. 28, 2005 (EP) ..... 338363-001

(51) LOC (9) Cl. ..... 19 08
(52) U.S. Cl. ..... D20/19; D20/22
(58) Field of Classification Search ..... D20/10, D20/11, 12, 19, 22, 27, 28, 40, 43, 99; 283/56, 283/81; 40/6, 27, 124.01, 124.05, 299.01, 40/300, 302, 310, 638, 641, 661.04, 661.06, 40/661.08, 662, 663; 281/5; 340/568, 571.2, 340/572.1, 572.3, 572.8, 572.9, 573; 292/307 A; 428/80.1; 235/492; D11/3; D30/155; D10/106; 24/16 PB
See application file for complete search history.

(56) References Cited

U.S. PATENT DOCUMENTS 770,255 A * 9/1904 Bates ..... 40/662
3,468,050 A * 9/1969 Pool ..... 40/302
D234,473 S * 3/1975 Ringle ..... D20/22
4,506,415 A * 3/1985 Swift ..... 24/16 PB
4,914,843 A * 4/1990 DeWoskin ..... 40/633
5,381,617 A * 1/1995 Schwartztol et al. ..... 40/6
5,581,924 A * 12/1996 Peterson ..... 40/633
6,092,321 A * 7/2000 Cheng ..... 40/633
D519,871 S * 5/2006 Curtis et al. ..... D11/3
7,052,055 B1 * 5/2006 Castro et al. ..... 292/307 A
7,119,690 B2 * 10/2006 Lerch et al. ..... 340/572.1
2003/0173408 A1 * 9/2003 Mosher et al. ..... 235/492
2006/0087437 A1 * 4/2006 Lerch et al. ..... 340/572.8
2006/0202829 A1 * 9/2006 Girvin et al. ..... 340/572.3

* cited by examiner

*Primary Examiner*—Philip S Hyder
*Assistant Examiner*—Mary Ann Calabrese
(74) *Attorney, Agent, or Firm*—Townsend and Townsend and Crew LLP; Gerald T. Gray

(57) CLAIM

The ornamental design for tag, as shown and described.

DESCRIPTION

FIG. 1 is a top plan view of a tag showing my new design;
FIG. 2 is a front elevational view thereof;
FIG. 3 is a left side elevational view thereof;
FIG. 4 is a right side elevational view thereof;
FIG. 5 is a rear elevational view thereof; and,
FIG. 6 is a bottom plan view thereof.

1 Claim, 1 Drawing Sheet

Matter enclosed in heavy brackets [ ] appears in the original patent, but forms no part of this reissue; matter printed in italics indicates the additions made by reissue.

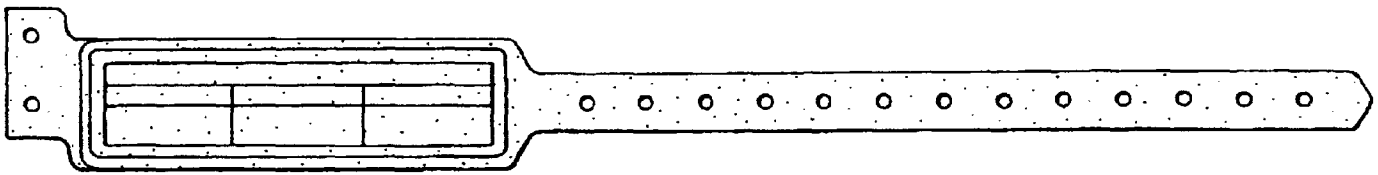
FIG. 1
FIG. 2
FIG. 3
FIG. 4
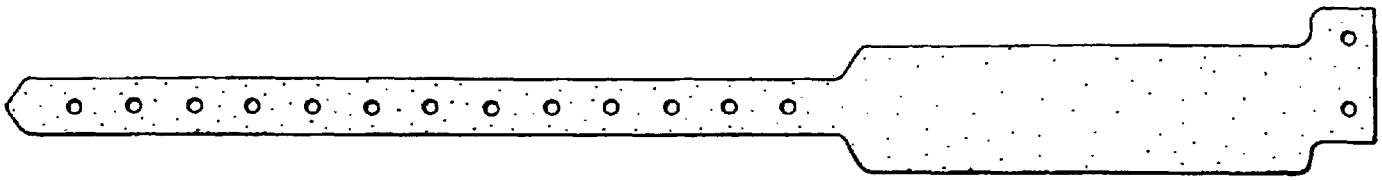
FIG. 5
FIG. 6